Nov. 8, 1966 H. F. KOTECKI 3,284,726

SQUARE LAW COMPANDER SYSTEM UTILIZING A HALL EFFECT MULTIPLIER AS THE SQUARE LAW DEVICE

Filed March 3, 1964

INVENTOR.
Harry F. Kotecki
BY Mueller & Aichele
Attys.

3,284,726

SQUARE LAW COMPANDER SYSTEM UTILIZING A HALL EFFECT MULTIPLIER AS THE SQUARE LAW DEVICE

Harry F. Kotecki, Glen Ellyn, Ill., assignor to Motorola, Inc., Franklin Park, Ill., a corporation of Illinois Filed Mar. 3, 1964, Ser. No. 349,014
3 Claims. (Cl. 333—14)

Figure 1:
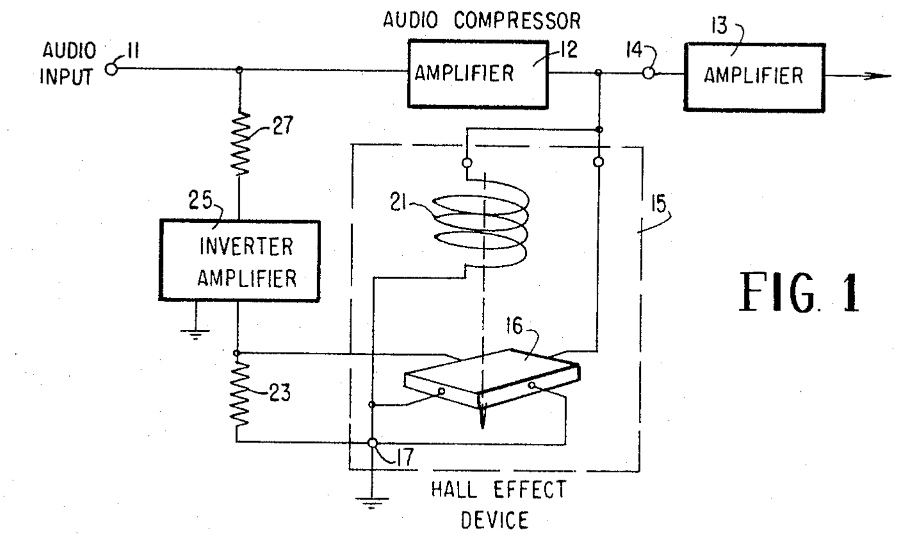

This invention relates to signal amplitude compressor-expander systems, and more particularly to an improved compressor-expander system utilizing a Hall effect multiplier.

Signal amplitude compressor-expander systems find many applications in the electronics field. For example, any communications system in which the signal is in analog form, such as telephone, radio and television, and in which it is desirable to reduce the dynamic range of the transmitted information to enable it to be more easily separated from the received transmission noise, may advantageously utilize a signal amplitude compressor-expander system. Signal amplitude compression and expansion also has application for sound motion picture film systems for better sound reproduction within the limitations of the film's sound track.

A satisfactory compression-expansion system must carefully match the characteristics in the compressor with those in the expander in order that an undistorted signal will result. Many compressors and expanders have heretofore been designed employing non-linear complementary devices such as diodes, or linear circuits arranged to approximate the non-linear function in discrete steps. In the former, care in matching the components is essential to the attainment of distortion free operation. In the latter type of system, signal levels in the corresponding portions of the circuit must be carefully adjusted to avoid distortion.

It is an object of this invention to provide a non-linear compression-expansion system requiring a minimum of adjustment due to inherent high accuracy.

Another object of the invention is to provide a compressor-expander system which is low in cost and simple of construction.

Still another object of the invention is to provide a compressor-expander system which avoids the need for matching non-linear components.

A feature of the invention is the provision of a signal amplitude compressor-expander system utilizing Hall effect multipliers arranged to produce a compressor output proportional to the square root of its input, and to produce an expander output proportional to the square of its input.

Another feature of the invention is the provision of a compressor-expander system wherein complementary multipliers utilize a square law function as the non-linear function, to eliminate distortion of the recovered signal without the need for matched components.

Still another feature of the invention is the provision of a compressor having an amplifier with a feedback circuit which includes a Hall effect multiplier and an inverter amplifier for squaring the output of the amplifier and subtracting it from the input thereof.

Figure 2:
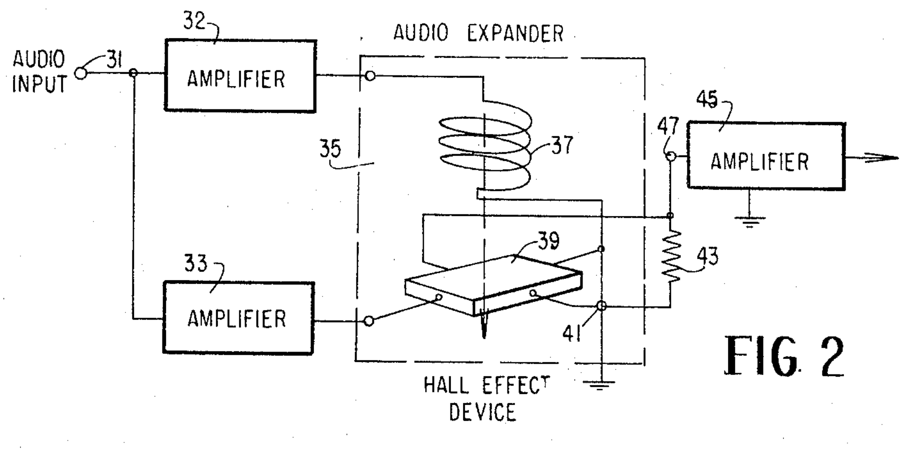

In the drawing:

FIG. 1 is a schematic diagram of an audio compressor in accordance with the invention; and, FIG. 2 is a schematic diagram of an audio expander utilizing the invention.

In accordance with the invention, a signal amplitude compressor-expander system includes a compressor and a complementary expander, each following a square law function. The compressor has an amplifier and a feedback circuit about the amplifier which multiplies the signal. The multiplier may preferably be a Hall effect device, to which the output of the amplifier is applied. The multiplier produces an output corresponding to the square of the applied signal and this output is inverted and returned to the input of the amplifier to be subtracted therefrom. The resulting output of the amplifier closely approximates the square root of the applied input. The expander includes a multiplier for squaring the signals applied thereto to restore the original characteristics of the input signal to the compressor. The expander may also include a Hall effect device as a multiplier.

Referring more particularly to FIG. 1, the audio compressor is shown having an audio input terminal 11 which is connected to an amplifier 12. A further amplifier 13 may be connected to output terminal 14 in series with amplifier 12. A feedback circuit is provided from the output of amplifier 12 to the input thereof which includes Hall effect device 15 connected to the output terminal 14. Hall effective device 15 includes a Hall element 16 across which the output of amplifier 12 is coupled. The output of amplifier 12 is also connected across the magnetic input of the Hall effect device comprised of induction coil 21. Coil 21 provides a magnetic field as shown by the dotted arrow for the Hall element 16. The Hall effect device 15 is grounded to common terminal 17.

The output of the Hall effect device will be proportional to the product of the signals applied to the two inputs, that is, it will be proportional to the product of the current applied across the input of the Hall element and the current applied through the coil 21. Since in each case this current is the output of amplifier 12, the output of the Hall effect device across resistor 23 will be proportional to the square of the output current of amplifier 12.

The output of the Hall effect device 15 is applied to an inverter amplifier 25, and from there through resistor 27 to the input of amplifier 12. This results in a subtraction of the squared output of amplifier 12 from the input thereto. Thus the output of the compressor will equal the difference between the input signal and the feedback signal multiplied by the gain of amplifier 12. Since the feedback signal is proportional to the square of the compressor output, if the gain of inverter amplifier 25 or amplifier 12 or both is sufficiently high the output current of the compressor will be very nearly proportional to the square root of the input current.

The operation of the compressor may perhaps be more readily understood when explained mathematically as follows:

$E_{out}=(E_{in}-E_f)G$, where $E_{out}$ is the output signal of the compressor, $E_{in}$ is the input signal, $E_f$ is the feedback from the output to the input of amplifier 12, and G is the gain of amplifier 12. The gain of amplifier 25 may be represented by K and the proportionality constant of the Hall effect device by B. The feedback signal is then represented by $$KB\left(\frac{E_{out}}{R_o}\right)^2$$

where $R_c$ is the resistance of the feedback circuit. Substituting we get $$E_{out}=\left[E_{in}-KB\left(\frac{E_{out}}{R_c}\right)^2\right]G$$

Solving this equation for $E_{in}$ we arrive at the expression $$E_{in}=\frac{E_{out}}{G}+KB\left(\frac{E_{out}}{R_c}\right)^2$$

Where G or K or both are large, $$\frac{E_{out}}{G}$$

will be a negligible quantity as compared to $$KB\left(\frac{E_{out}}{R_c}\right)^2$$

and hence $E_{out}$ will be proportional to the square root of $E_{in}$. Therefore the output of the compressor is proportional to the square root of the input thereto.

Referring now to FIG. 2, the complementary audio expander is shown. Signals corresponding to the signals at output terminal 14 of the compressor amplified by amplifier 13 are applied to input terminal 31 of the expander. Amplifiers 32 and 33 each is fed by the input signal and apply it to Hall effect device 35, which may be identical with device 15 of FIG. 1. The output of amplifier 32 is applied to induction coil 37, which produces a field through Hall element 39, as shown by the dotted arrow. The output of amplifier 33 is applied across Hall element 39, and the device is provided with a common terminal 41.

The output of Hall effect multiplier 35 is derived across resistor 43 and is proportional to the product of the outputs of amplifiers 32 and 33, that is, the square of the input signal to terminal 31. Since the compressor provided an output signal following a square law function, and since the expander similarly follows this square law function in restoring the signal, the signal at output terminal 47 will correspond to the characteristics of the input signal at terminal 11 of the compressor. This then may be amplified by amplifier 45.

The operation of the expander may be more clearly understood from a methematical explanation as follows:

$$E_{out}=B\left(\frac{E_{in}}{R_e}\right)^2$$

where $E_{out}$ is the output signal of the expander and $E_{in}$ is the input signal. The proportionality constant of the Hall effect device is represented by B, and the expression $$\frac{E_{in}}{R_e}$$

is the current in the expander where $R_e$ is its resistance.

Since $E_{in}$ of the expander equals $E_{out}$ of the compressor and since $E^2_{out}$ of the compressor is approximately equal to the expression $$\frac{R_c^2}{KB}$$

times $E_{in}$ of the compressor, $E_{out}$ of the expander is approximately equal to the expression $$\frac{R_c^2}{KR_e}2$$

times $E_{in}$ of the compressor.

Thus, since the expression $$\frac{R_c^2}{KR_e}2$$

is constant, the output of the expander varies linearly with the input of the compressor. This indicates the amplitude characteristics or balance of the original signal have been restored after compression and expansion.

As may be seen from the above discussion, the fact that the proportionality constants of the two Hall effect devices differ will not appreciably affect the operation of the device since their relationship will be a linear one. Furthermore, it should be noted that a Hall effect multiplier is not necessarily essential to the carrying out of the invention providing the square law function is utilized so that complementary operation can occur. The invention provides circuit simplicity requiring only a minimum of adjustment. Inherent high accuracy in the non-linear function eliminates the need for special matching of components and provides low distortion operation without the necessity of adjusting signal levels in compressor and expander into correspondence.

I claim:

1. A signal amplitude compressor including in combination a first high gain linear amplifier having an input for receiving an input signal and an output, a Hall effect multiplier having first and second input conductors connected to said output of said amplifier and an output conductor, resistor means connected to said output conductor providing a load for said Hall effect multiplier to provide a signal thereacross representing the square of the signal applied to said first and second input conductors, an inverter amplifier connecting said resistor means to said input of said first amplifier for applying the inverted squared signal thereto, so that the inverted squared signal from said Hall effect multiplier is subtracted from the compressor input signal applied to said first amplifier input, said first amplifier providing a compressor output signal at said output thereof which is proportional to the square root of the compressor input signal.

2. A signal amplitude compressor-expander system including in combination, a compressor having first linear high gain amplifying means for amplifying input signals applied thereto, a first Hall effect multiplier having a pair of input conductors connected to the output of said first amplifying means and further having an output conductor providing a signal representing the square of the signal applied to said pair of input conductors, inverter means coupling the output of said first Hall effect multiplier to the input of said first amplifying means so that the inverted squared output of said inverter means is substracted from the input signal to said first linear amplifying means so that said first linear amplifying means provides an output signal which is proportional to the square root of the input signal, and a complementary expander including second amplifying means having first and second output means for amplifying signals corresponding to the output signal of said first linear amplifying means of said compressor, said expander further including a second Hall effect multiplier having a pair of input conductors connected to said first and second output means and having an output conductor for conducting signals therefrom representing the product of signals applied to said input conductors, thereby producing signals having the original amplitude characteristics of signals applied to the input of said compressor.

3. A signal amplitude compressor-expander system including in combination, a compressor having first and second linear high gain amplifiers connected in series between an input terminal and an output terminal, said compressor further having a first Hall effect multiplier having a pair of input conductors connected to the juncture of said first and second amplifiers and an output conductor resistor means connected to said output conductor forming a load for said Hall effect multiplier to provide a signal thereacross representing the square of the signal applied to said input conductors, said compressor further having an inverter amplifier connecting said restor means to the input of said first amplifier to subtract the inverted squared output of said inverter amplifier from the input signal applied to said first amplifier so that said first linear amplifier produces an output signal which is proportional to the square root of the compressor input signal, and a complementary expander including first amplifying means for amplifying signals corresponding to the output signals of said second amplifier of said compressor and having first and second output means, said expander further having a second Hall effect multiplier with two input conductors and an output conductor for conducting signals therefrom representing the product of signals applied to said input conductors, said input conductors being connected to said first and second output means respectively, said expander further having second amplifying means connected to said output conductor of said second Hall effect multiplier for amplifying signals from said second Hall effect multiplier representing the original amplitude characteristics of signals applied to said compressor.

References Cited by the Examiner

UNITED STATES PATENTS

| | | | |
|---|---|---|---|
| 2,019,637 | 11/1935 | Shelleng | 333—14 |
| 2,355,991 | 8/1944 | Meyers | 330—86 X |
| 2,395,758 | 2/1946 | Potter | 333—14 |
| 3,097,296 | 7/1963 | Chasmar et al. | 330—6 X |

HERMAN KARL SAALBACH, *Primary Examiner.*

ELI LIEBERMAN, P. L. GENSLER, *Assistant Examiners.*